US007000671B2

(12) United States Patent
Biewer

(10) Patent No.: US 7,000,671 B2
(45) Date of Patent: Feb. 21, 2006

(54) ROLLER BLIND SYSTEM, IN PARTICULAR FOR A SUNROOF

(75) Inventor: Christian Biewer, Münster (DE)

(73) Assignee: ArvinMeritor GmbH, (DE)

( * ) Notice: Subject to any disclaimer, the term of this patent is extended or adjusted under 35 U.S.C. 154(b) by 0 days.

(21) Appl. No.: 10/727,285

(22) Filed: Dec. 3, 2003

(65) Prior Publication Data

US 2004/0112549 A1 Jun. 17, 2004

(30) Foreign Application Priority Data

Dec. 5, 2002 (DE) ................................ 102 56 929

(51) Int. Cl.
*E06B 9/08* (2006.01)

(52) U.S. Cl. .............. 160/121.1; 160/122; 160/370.22; 296/214

(58) Field of Classification Search ............. 160/121.1, 160/120, 23.1, 273.1, 370.22; 296/978, 138, 296/143, 145, 214
See application file for complete search history.

(56) References Cited

U.S. PATENT DOCUMENTS 5,067,546 A * 11/1991 Jeuffray et al. ............ 160/23.1
5,183,093 A * 2/1993 Kraeutler ................. 160/84.06
5,542,463 A * 8/1996 Pinkalla et al. .......... 160/273.1
6,012,505 A 1/2000 Wurz et al.
6,068,008 A * 5/2000 Caldwell ..................... 135/99
6,216,714 B1 * 4/2001 Tucker .................... 135/88.01
2002/0092630 A1 * 7/2002 Kremer et al. ......... 160/370.22
2004/0140063 A1 * 7/2004 Abouloukme ............... 160/122

FOREIGN PATENT DOCUMENTS

CH 545 906 2/1974
DE 196 39 478 7/1997
DE 19750713 C1 12/1998
DE 19739919 A1 3/1999
DE 198 44 779 11/1999

OTHER PUBLICATIONS

Austrian Patent Office Search Report, Jan. 14, 2003.
European Search Report, Mar. 17, 2004.

* cited by examiner

*Primary Examiner*—Blair M. Johnson
(74) *Attorney, Agent, or Firm*—Carlson, Gaskey & Olds

(57) ABSTRACT

A roller blind system comprising a first roller blind, a second roller blind and a coiling body that accommodates the first and second roller blinds. The edges of the first and second roller blinds are offset with respect to each other in an axial direction relative to the rotational axis of the coiling body.

21 Claims, 4 Drawing Sheets

ROLLER BLIND SYSTEM, IN PARTICULAR FOR A SUNROOF

REFERENCE TO RELATED APPLICATIONS

The present invention claims the benefit of German Patent Application No. 102 56 929.0, filed Dec. 5, 2002.

TECHNICAL FIELD

The invention relates to a roller blind system, and more particularly to a roller blind system for use in a vehicle roof.

BACKGROUND OF THE INVENTION

Roller blind systems for use in vehicle roofs may include a first roller blind, a second roller blind, and a coiling body on which the first and second roller blinds are accommodated so that they lie on top of each other.

A roller blind system of this type is known from German Patent Document 197 50 713. The two roller blinds are accommodated on the coiling body to lie congruent to each other. In this type of structure, the roller blinds are guided only on their front margins; lateral guidance of the roller blinds is not provided in the structure.

There are also known roller blinds which are laterally guided (see, for instance, German Laid-Open Document 197 39 919). The roller blind has an edge band extending along the margin of the roller blind and received in a guide.

However, currently known structures are unable to accommodate two roller blinds each having an edge band onto one single coiling body because the two edge bands of the two roller blinds would end up being disposed on top of each other. This would result in a coil with such a high thickness at its edges that it would adversely affect system operability and require an unnecessarily large amount of space to accommodate the increased thickness.

One object of the invention to provide a compact roller blind system having two roller blinds that are adapted to be guided laterally and that can be accommodated on a single coiling body without any of the disadvantages noted above.

SUMMARY OF THE INVENTION

A roller blind system according to one embodiment of the invention offsets edges of two roller blinds with respect to each other in an axial direction relative to a rotational axis of a coiling body. This offset prevents an edge band of one roller blind from lying on top of an edge band of the other roller blind. As a result, the thicknesses of the two edge bands do not add together when the two roller blinds are wound on the coiling body, preventing excessive bulk.

In one embodiment, the two roller blinds are designed to have the same width and are then accommodated on the coiling body by being offset relative to each other. In another embodiment, a first roller blind has a width that is larger than the width of a second roller blind.

To guide the edge band of each of the roller blinds, the roller blind system includes at least one guide that receives the edge band for each roller blind when the roller blind is withdrawn from the coiling body. In various embodiments, two guides corresponding to the first and second roller blinds may extend in the same plane or in different planes.

BRIEF DESCRIPTION OF THE DRAWINGS

The invention will be described in the following detailed description with reference to two embodiments illustrated in the attached drawings in which.

DETAILED DESCRIPTION OF THE EMBODIMENTS

Figure 1:
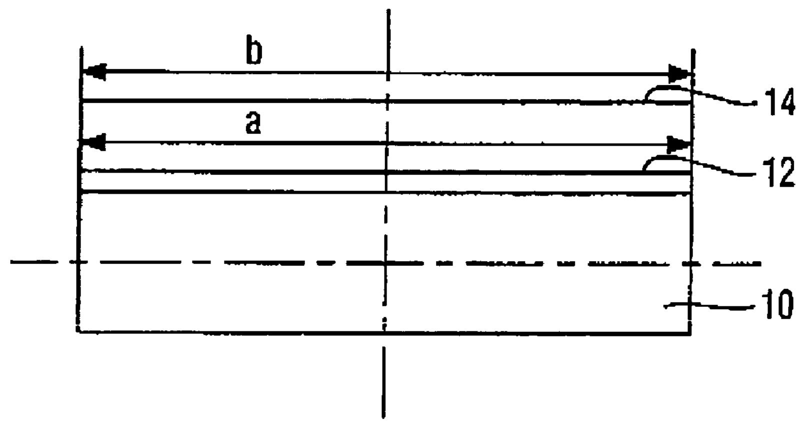
FIG. 1 schematically shows an example of a prior art roller blind system.

FIG. 1 schematically shows a coiling body 10 of one example of a conventional roller blind system. Accommodated on the coiling body 10 are first and second roller blinds 12, 14. The width a of the first roller blind 12 is equal to a width b of the second roller blind 14. Because of these equal widths, the margins of the two first and second roller blinds 12, 14 are aligned directly one above the other, causing excessive bulk at the edges when the first and second roller blinds 12, 14 are coiled onto the coiling body 10.

Figure 2:
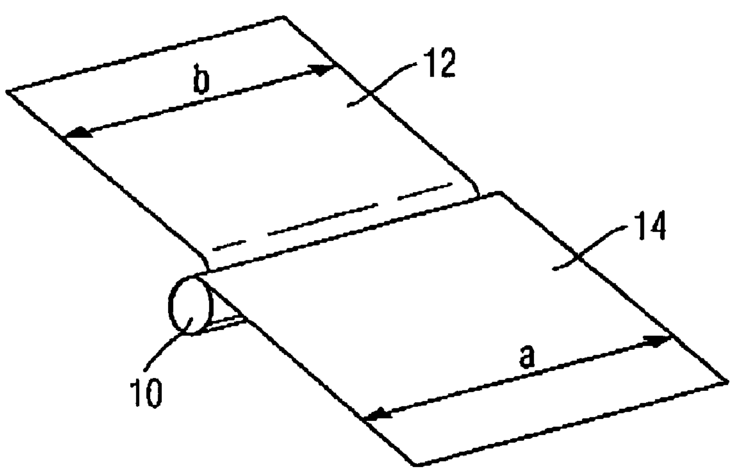
FIG. 2 is a schematic, perspective view a roller blind system according to one embodiment of the invention.

FIG. 2 is a representative diagram of a roller blind system according to one embodiment of the invention. The first and second roller blinds 12, 14 are accommodated on the coiling body 10 having a rotational axis L. The first roller blind 12 has a width a that is larger than the width b of the second roller blind 14. These different widths prevent the edges of the first and second roller blinds 12, 14 from aligning so that they are disposed directly on top of each other on the coiling body 10 when they are coiled up.

Figure 8:
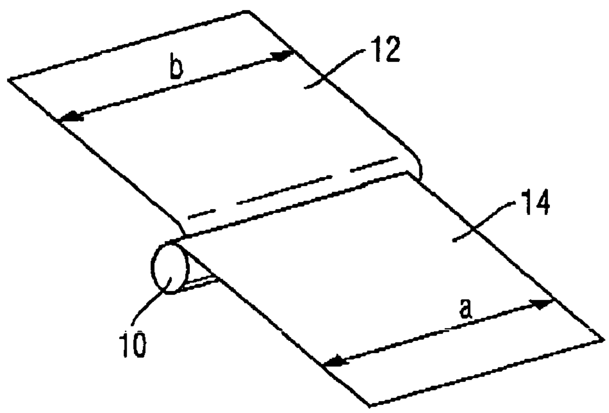
FIG. 8 schematically shows another embodiment of the invention.

Note that alternatively, the first and second roller blinds 12, 14 may have the same width and be offset axially relative to each other along the coiling body 10 as shown in FIG. 8. This offsets the edges of the roller blinds 12, 14 without having to manufacture roller blinds of two different sizes.

Figure 5:
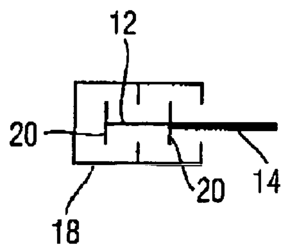
FIG. 5 schematically shows a guide for the roller blind system of FIG. 3.
Figure 3:
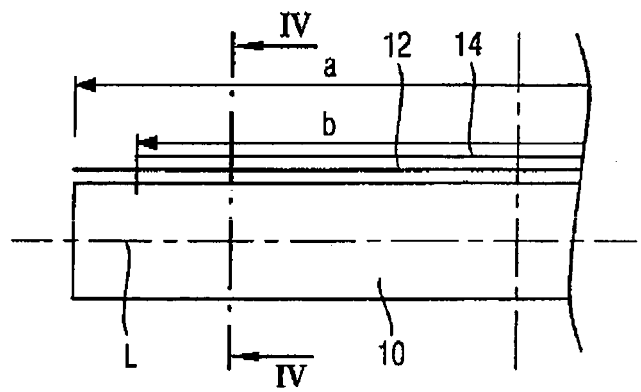
FIG. 3 schematically shows a roller blind system according to one embodiment of the invention.
Figure 4:
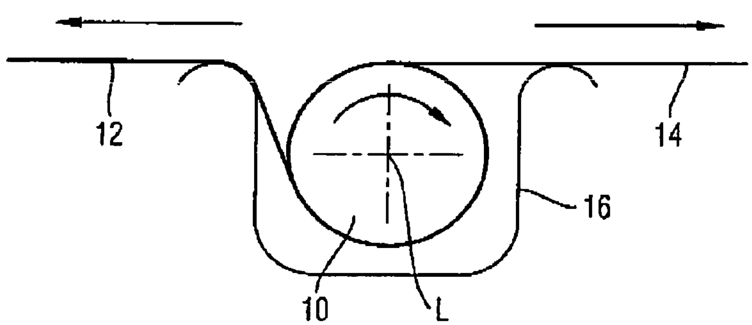
FIG. 4 schematically shows a section along plane IV of FIG. 3.

FIGS. 3, 4 and 5 illustrate an embodiment of a roller blind system having a housing 16 (FIG. 4) that is symmetrical with respect to a plane orthogonal to the rotational axis of the coiling body and that surrounds the coiling body 10 and the roller blinds accommodated thereon. Moreover, the figures schematically show a guide 18 that receives an edge band 20 and that is attached to the two margins of the roller blinds 12, 14. Note that the guide 18 is depicted schematically only and is in fact, it extends at the level of the outer margin of the coiling body 10 such that the guide for the first roller blind 12 extends in one direction and the guide for the second roller blind 14 extends in the opposite direction.

Figure 7:
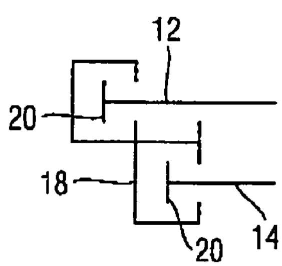
FIG. 7 shows a guide for the roller blind system of FIG. 6.
Figure 6:
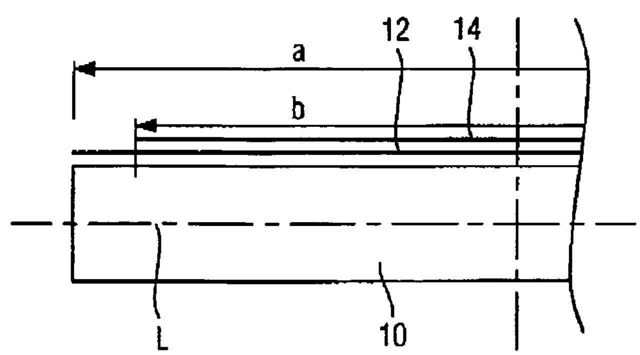
FIG. 6 schematically shows a roller blind system according to another embodiment of the invention.
Figure 9:
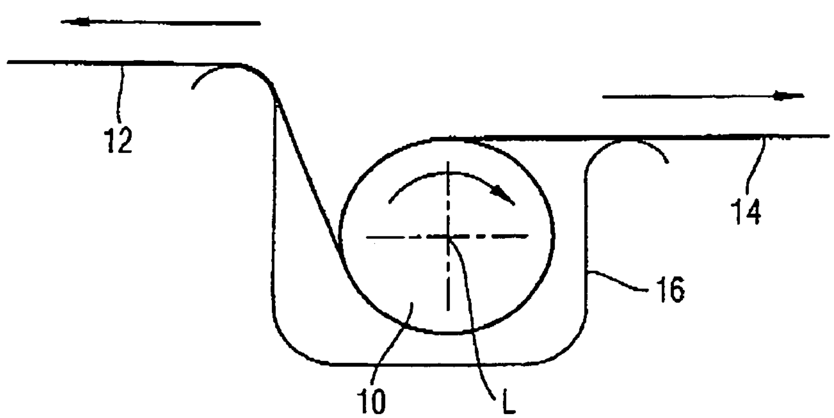
FIG. 9 schematically shows another embodiment of the invention.

FIGS. 6 and 7 illustrate another embodiment of the roller blind system. In this embodiment, the first and second roller blinds 12, 14 are guided in different planes rather than in the same plane. The different planes can be obtained simply by designing the housing 16 to guide the second roller blind 14 such that the second roller blind 14 exits in a plane that is lower than the first roller blind (e.g., by making the housing shown in FIG. 4 asymmetrical with respect to a plane orthogonal to the rotational axis of the coiling body), as shown in FIG. 9.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A roller blind system comprising:
- a first roller blind for a vehicle sunroof, said first roller blind having at least a first edge;
- a second roller blind for the vehicle sunroof, said second roller blind having at least a second edge adjacent and parallel to said first edge; and
- a coiling body that accommodates the first and second roller blinds, wherein the first roller blind is disposed on top of the second roller blind when the first and second roller blinds are coiled on the coiling body,
- wherein the first and second edges are offset in an axial direction relative to a rotational axis of the coiling body.

2. The roller blind system as claimed in claim 1, wherein the first roller blind has a width that is larger than a width of the second roller blind.

3. The roller blind system as claimed in claim 1, wherein the first and second roller blinds have substantially equal widths, and wherein the first roller blind is offset in the axial direction with respect to the second roller blind.

4. The roller blind system as claimed in claim 1, further comprising a guide having a first guide portion that accommodates the first edge and a second guide portion that accommodates the second edge.

5. The roller blind system as claimed in claim 4, wherein the first and second guide portions guide the first and second roller blinds in a single plane.

6. The roller blind system as claimed in claim 4, wherein the first and second guide portions guide the first and second roller blinds in different planes.

7. The roller blind system as claimed in claim 4, further comprising at least a first edge band on the first edge and at least a second edge band on the second edge, wherein the first and second edge bands hold the first and second edges, respectively, in the first and second guide portions of the guide.

8. The roller blind system as claimed in claim 1, further comprising a housing that houses the coiling body, wherein the housing is symmetrical with respect to a plane orthogonal to the rotational axis of the coding body to support the first and second roller blinds to extend in opposite directions in a single plane.

9. The roller blind system as claimed in claim 1, further comprising a housing that houses the coiling body, wherein the housing is asymmetrical with respect to a plane orthogonal to the rotational axis of the coiling body to support the first and second roller blinds to extend in opposite directions in two different planes.

10. A roller blind system comprising:
- a first roller blind for a vehicle sunroof, said first roller blind having at least a first edge;
- a second roller blind for the vehicle sunroof, said second roller blind having at least a second edge adjacent said first edge; and
- a coiling body that accommodates the first and second roller blinds, wherein the first roller blind is disposed on top of the second roller blind when the first and second roller blinds are coiled on the coiling body;
- a housing that houses the coiling body; and
- a guide that accommodates the first and second edges,
- wherein the first and second edges are offset in an axial direction relative to a rotational axis of the coiling body.

11. The roller blind system as claimed in claim 10, wherein the first and second roller blinds have equal widths, and wherein the first roller blind is offset in the axial direction with respect to the second roller blind.

12. The roller blind system as claimed in claim 10, wherein the first roller blind has a width that is larger than a width of the second roller blind.

13. The roller blind system as claimed in claim 10, wherein the guide has a first guide portion and a second guide portion, and wherein the first and second guide portions guide the first and second roller blinds in a single plane.

14. The roller blind system as claimed in claim 10, wherein the guide has a first guide portion and a second guide portion, and wherein the first and second guide portions guide the first and second roller blinds in different planes.

15. The roller blind system as claimed in claim 10, further comprising at least a first edge band on the first edge and at least a second edge band on the second edge, wherein the first and second edge bands hold the first and second edges, respectively, in the guide.

16. The roller blind system as claimed in claim 10, wherein the housing is symmetrical with respect to a plane orthogonal to the rotational axis of the coiling body to support the first and second roller blinds to extend in opposite directions in a single plane.

17. The roller blind system as claimed in claim 10, wherein the housing is asymmetrical with respect to a plane orthogonal to the rotational axis of the coiling body to support the first and second roller blinds to extend in opposite directions in two different planes.

18. The roller blind system as claimed in claim 1, wherein the first and second roller blinds are extendable from the coiling body in opposing directions.

19. The roller blind system as claimed in claim 1, wherein the at least a first edge comprises a pair of opposing first roller blind side edges and wherein the at least a second edge comprises a pair of opposing second roller blind side edges, the pair of opposing first roller blind side edges being axially offset from the pair of opposing second roller blind side edges along the rotational axis.

20. The roller blind system as claimed in claim 10, wherein the first and second roller blinds are extendable from the coiling body in opposing directions.

21. The roller blind system as claimed in claim 10, wherein the first and second edges are axially offset relative to each other along the rotational axis.

* * * * *

UNITED STATES PATENT AND TRADEMARK OFFICE

CERTIFICATE OF CORRECTION

PATENT NO. : 7,000,671 B2
APPLICATION NO. : 10/727285
DATED : February 21, 2006
INVENTOR(S) : Biewer, Christian It is certified that error appears in the above-identified patent and that said Letters Patent is hereby corrected as shown below:

Column 3, Line 52: Please delete “coding” and replace with --coiling--

Signed and Sealed this

First Day of August, 2006

JON W. DUDAS

*Director of the United States Patent and Trademark Office*